(12) United States Patent
Prink et al.

(10) Patent No.: US 12,347,060 B2
(45) Date of Patent: Jul. 1, 2025

(54) HEAD-FRAME SYMBOLOGY ISOLATION FOR HEAD WORN DISPLAY (HWD)

(71) Applicant: Rockwell Collins, Inc., Cedar Rapids, IA (US)

(72) Inventors: Jared R. Prink, Newberg, OR (US); Troy D. Driscoll, West Linn, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 429 days.

(21) Appl. No.: 17/874,770

(22) Filed: Jul. 27, 2022

(65) Prior Publication Data
US 2024/0037698 A1 Feb. 1, 2024

(51) Int. Cl.
*G06T 3/20* (2006.01)
*G06F 3/01* (2006.01)
*G06T 11/00* (2006.01)

(52) U.S. Cl.
CPC .............. *G06T 3/20* (2013.01); *G06F 3/012* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 8,749,620 B1 * | 6/2014 | Knight | H04N 13/211 348/49 |
| 9,395,539 B2 | 7/2016 | Schmidt et al. | |
| 10,088,848 B2 | 10/2018 | Hodge | |
| 10,338,389 B2 | 7/2019 | Han | |
| 10,438,391 B1 | 10/2019 | Kreutzkamp et al. | |
| 10,495,884 B2 | 12/2019 | Benesh et al. | |
| 10,606,073 B1 | 3/2020 | Black et al. | |
| 2007/0041684 A1 | 2/2007 | Popovich et al. | |
| 2011/0141134 A1 | 6/2011 | Sasaki | |

(Continued)

FOREIGN PATENT DOCUMENTS

GB 2472773 B 1/2015

OTHER PUBLICATIONS

Extended European Search Report dated Dec. 22, 2023; European Application No. 23186679.9.

*Primary Examiner* — Sarah Le
(74) *Attorney, Agent, or Firm* — Suiter Swantz IP (57) ABSTRACT

A system and method for channeled processing of head-frame and earth-frame symbology for display by a head worn display (HWD) receives image data associated with a head pose (e.g., based on a head-centered or earth-centered reference frame) and generates both head-frame and earth-frame symbology. The head-frame and earth-frame symbology sets are each encoded according to different color ranges or values by image rendering processors in communication with the HWD. The HWD tracker processors receive the image data and color range encoded symbology and the HWD pose augmentation processors adjust either the head-frame or earth-frame symbology according to the associated head pose data (bypassing the other symbology set) before returning the pose-adjusted symbology to the tracker processors for generation of an output image for display by the HWD wherein color encoding is removed from the symbology sets (e.g., head-frame/adjusted earth-frame, or earth-frame/adjusted head-frame).

20 Claims, 7 Drawing Sheets

(56) References Cited

U.S. PATENT DOCUMENTS

| | | | |
|---|---|---|---|
| 2016/0055671 A1 | 2/2016 | Menozzi et al. | |
| 2016/0270656 A1 | 9/2016 | Samec et al. | |
| 2017/0343809 A1 | 11/2017 | Benesh et al. | |
| 2018/0061121 A1 | 3/2018 | Yeoh et al. | |
| 2018/0288423 A1* | 10/2018 | Vembar | H04N 19/124 |
| 2018/0308257 A1* | 10/2018 | Boyce | H04N 19/42 |
| 2019/0094981 A1 | 3/2019 | Bradski et al. | |
| 2020/0183491 A1 | 6/2020 | Sanchez et al. | |
| 2020/0204782 A1* | 6/2020 | Najaf-Zadeh | H04N 19/167 |
| 2021/0081037 A1 | 3/2021 | Foote et al. | |
| 2021/0311307 A1* | 10/2021 | Peri | G02B 27/017 |
| 2021/0341995 A1 | 11/2021 | Wood et al. | |
| 2022/0129066 A1 | 4/2022 | Zahnert et al. | |
| 2022/0155852 A1 | 5/2022 | Grossetête et al. | |

\* cited by examiner

HEAD-FRAME SYMBOLOGY ISOLATION FOR HEAD WORN DISPLAY (HWD)

BACKGROUND

Head worn display (HWD) systems (e.g., helmet mounted displays (HMD)) may enhance the view of a pilot or other user (e.g., from an aircraft cockpit) via additional augmented reality (AR), virtual reality (VR), or mixed reality (MR) elements. For example, image elements within the pilot's field of view may be annotated by explanatory symbology, e.g., describing natural or manmade structures seen by the pilot or allowing the pilot to monitor aircraft operations without redirecting their gaze toward the instrument panel. HWD systems may even enable to pilot to see through the aircraft, providing views (e.g., toward terrain or structural elements or proximate aircraft that would otherwise be obstructed from view by the aircraft).

Conventional HWD systems treat received video data (e.g., from cameras mounted to, and that move with, the HWD) as relative to an earth-frame reference (e.g., in an earth-centered earth-fixed (ECEF) inertial reference frame). Accordingly, the HWD expects all data to conform to a view of the world as seen from the cockpit, and can manipulate said data to maintain conformality as the user's head moves. However, symbology generators may render some symbols in a head-frame reference. Head-frame symbols, relative to a head-centered inertial reference frame, should remain in a specific relative location (e.g., as seen by the user) regardless of any head motion on the part of the user. Attempts to render head-frame symbology in an earth-frame-only HWD system have resulted in undesirable movement of the head-frame symbology in response to user head motion, which impedes practical use of the HWD and may present a risk of hazardously misleading information (HMI).

SUMMARY

In a first aspect, a head-worn display (HWD) system is disclosed. In embodiments, the HWD system includes a HWD unit and an image rendering platform in communication with the HWD unit. For example, the HWD unit includes a display unit and a head tracker for determining a head pose (e.g., a position and orientation of the user's head) for each frame of image data displayed by the HWD. The image processing platform includes graphics generation processors for receiving the head pose for each frame and generating head-frame and earth-frame symbology sets. The image processing platform includes image rendering processors for encoding the head-frame and earth-frame symbology sets according to different color ranges, color channels, or color values. The image rendering processors also embed the associated head pose data in the image data, and forward the image data (along with the associated head pose data and the encoded head-frame and earth-frame symbology sets) to the HWD unit. Tracker processors of the HWD unit identify pixels corresponding to the earth-frame symbols (or, e.g., the head-frame symbols, if the associated head pose data is in the earth frame rather than the head frame) and forward the earth-frame symbol pixels to the pose augmentation processor of the HWD. The pose augmentation processors pose-adjust the earth-frame symbol pixels according to the associated head-frame head pose data and return the pose-adjusted pixels to the tracker processors. The tracker processors produce an output image for display to the user based on the image data, head-frame symbology, pose-adjusted earth-frame symbology) and remove any color range encoding from the symbology sets, resulting in an output image with a monochrome symbology overlay.

In some embodiments, the pose data associated with the current frame of image data is relative to the head frame, and the pose augmentation processor pose-adjusts the encoded earth-frame symbology according to the head-frame head pose data.

In some embodiments, the pose data associated with the current frame of image data is relative to the earth frame, and the pose augmentation processor pose-adjusts the encoded earth-frame symbology according to the earth-frame pose data.

In some embodiments, the HWD produces the output image for display by drawing the pose-adjusted symbology over the image data, and drawing the non-adjusted symbology over the pose-adjusted symbology.

In some embodiments, one or more encoded symbology sets (e.g., earth-frame and/or head-frame) includes a first set of pixels encoded at a particular color intensity and a second set of pixels encoded at a lower color intensity, e.g., within the same color channel or color range.

In some embodiments, pixel sets corresponding to higher-priority symbols are encoded at higher (relative) color intensities, while pixel sets corresponding to lower-priority symbols are encoded at lower (relative) color intensities.

In some embodiments, pixel sets encoded at higher color intensities correspond to symbols, and pixel sets encoded at lower color intensities correspond to halos or masks for the symbols, e.g., to resolve potential collisions with lower-priority symbols.

In some embodiments, the image rendering platform encodes embedded pose data associated with a frame of image data according to a third color range or channel. When producing the output image, the HWD removes the encoded embedded pose data from the image data.

In some embodiments, the head-frame and earth-frame symbology sets are encoded according to different color channels (e.g., within a RGB color environment).

In some embodiments, either the head-frame or earth-frame symbology is encoded according to one subset of a given color channel (e.g., higher-intensity blue) and the other symbology encoded according to another subset of that color channel (e.g., lower-intensity blue).

In some embodiments, the image rendering platform receives multiple sets of image data, each corresponding to a different set of head pose data at a different time (e.g., as determined by the head tracker), e.g., 2D image data and/or symbology and 3D/synthetic vision (SVS) image data and/or symbology. For example, the HWD head tracker determines a display head pose corresponding to a display time (e.g., associated with a time of display of the output image to the user), and the HWD pose augmentation processor pose-adjusts the relevant symbology within each set of image data by differencing the display time and the time associated with the head pose for each set of image data.

In a further aspect, a method for channeled processing and symbology isolation for HWD image data is also disclosed. In embodiments, the method includes receiving frames of image data for display by an HWD (e.g., as a processed output image) via an image rendering platform in communication with the HWD. The method includes determining, via an HWD head tracker, head pose data (e.g., a position and orientation of the HWD user's head) corresponding to the image data. The method includes forwarding the pose data to the image rendering platform. The method includes generating, via the image rendering platform, symbology sets for the image data, e.g., symbols relative to a head-centered inertial reference frame ("head-frame") and symbols relative to an earth-centered inertial reference frame ("earth-frame"). The method includes encoding each symbology set according to a color channel, range, or value (e.g., head-frame symbology encoded with blue color values, earth-frame symbology encoded with green color values). The method includes forwarding to the HWD the image data, associated head pose data (e.g., embedded in the image data), and the encoded head-frame and earth-frame symbology sets. The method includes receiving and pose-adjusting, via HWD pose augmentation processors, symbology not associated with the reference frame of the associated head pose data to align with that reference frame. The method includes producing an output image for display to the HWD user based on the image data, the pose-adjusted encoded symbology, and the non-adjusted symbology. The method includes removing all color encoding from the output image, such that all symbology is rendered in a uniform color.

In some embodiments, the image data is associated with head pose data relative to the head frame, and the pose augmentation processors pose-adjust the earth-frame symbology to align with the head frame.

In some embodiments, the image data is associated with head pose data relative to the earth frame, and the pose augmentation processors pose-adjust the head-frame symbology to align with the earth frame.

In some embodiments, the method includes producing the output image by drawing or rendering the pose-adjusted symbology over the image data, and rendering the non-adjusted symbology over the pose-adjusted symbology.

In some embodiments, the method includes encoding pixel sets within a symbology set according to a first color intensity, and encoding other pixel sets within the symbology set according to a lower color intensity.

In some embodiments, the pixel sets encoded at the first color intensity include higher-priority symbols, and the pixel sets encoded at lower color intensities include lower-priority symbols.

In some embodiments, the pixel sets encoded at the first color intensity include higher-priority symbols, and the pixel sets encoded at lower color intensities include masks or halos for the higher-priority symbols, e.g., to alleviate collisions with lower-priority symbols.

In some embodiments, the method includes embedding the head pose data within the associated frame of image data. The method includes encoding the embedded pose data according to a third color range, channel, or value (e.g., white). The method includes producing the output image by removing the embedded pose data from the image data.

In some embodiments, the method includes receiving multiple sets of image data (e.g., 2D, 3D) for incorporation into a single output image, each set of image data corresponding to a different head pose at a different time. The method includes determining, via the HWD tracker, a display pose for a display time (e.g., for display of the output image to the user). The method includes pose-adjusting, via the pose augmentation processors, the relevant symbology of each set of image data based on the display pose and time differencing of the display time and the time corresponding to the head pose data of each set of image data.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, a head worn display (HWD) providing for channeled management and display of head-frame and earth-frame symbology is disclosed. Earth-frame and head-frame symbology are distinguished by the HWD tracker processor according to color-based encoding, such that earth-frame symbology receives the necessary pose augmentation to maintain conformality and head-frame symbology bypasses pose augmentation, The merged video streams are displayed in monochrome, e.g., in a green color associated with optimal human eye response when overlaid on a transparent display. Tracker processing can address and resolve potential symbol collisions. Further, legacy systems may be updated with channeled management capabilities without the need for addition or certification of new hardware.

Figure 1:
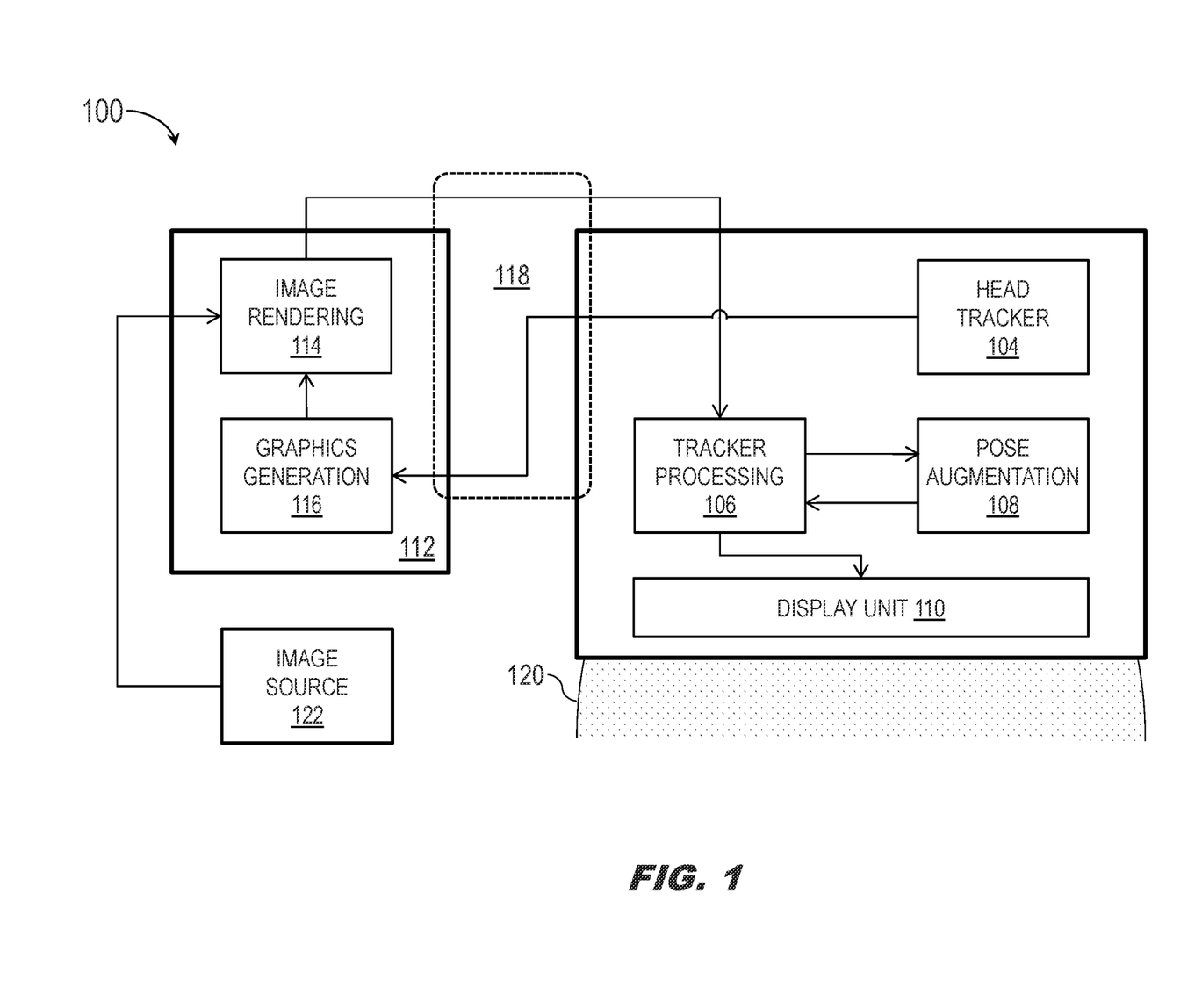
FIG. 1 is a block diagram illustrating a head worn display (HWD) system according to example embodiments of this disclosure.

FIG. 1—HWD System Generally

Referring to FIG. 1, a head worn display system 100 (HWD; e.g., helmet mounted display (HMD)) is shown. The HWD system 100 may include: (e.g., within the HWD unit 102 proper) head tracker 104, tracker processor 106 (e.g., Tracker Processing Unit (TPU)), pose augmentation processor 108, and display unit 110; and an image rendering platform 112 (including, e.g., image rendering processors 114 and graphics generation processors 116 (GGP)) connected to the HWD via HDMI video bus 118.

In embodiments, the HWD system 100 may be implemented similarly to HWD systems as disclosed by commonly owned U.S. patent application Ser. No. 17/345,325, which is herein incorporated by reference in its entirety. For example, the HWD system 100 may be implemented as a helmet or visor worn by a user 120 and at least partially obscuring the user's head or eyes. In embodiments, the display unit 110 may be implemented on the inner surface of a visor proximate to one or both eyes of the user 120 and at least partially translucent or transparent to allow vision therethrough, e.g., when the display unit is inactive. For example, the display unit 110 may be fixed to the visor or helmet such that the display unit moves with the head of the user 120. In embodiments, visual information (e.g., image data received from various image sources 122 and/or symbology generated by the GGP 116, as processed by the HWD unit 102) may be projected onto the display unit 110; some elements of visual information may change in position to match movements of the head and/or eyes of the user 120. In embodiments, image sources 122 may include cameras or image sensors mounted within an aircraft and in communication with the HWD system 100, as well as enhanced vision systems (EVS) and/or synthetic vision systems (SVS).

In embodiments, the head tracker 104 may include inertial measurement units (IMU) and/or any other appropriate positioning devices for monitoring movements of the head of the user 120 and determine (e.g., for each frame of image data received from various image sources 122) current head pose data, e.g., the current position and orientation of the head of the user. For example, head pose data may be expressed in a head-centered inertial reference frame ("head frame"), e.g., relative to a nominal head pose associated with a default position and orientation of the head, or in other inertial reference frames (e.g., earth-centered, earth-fixed (ECEF) inertial reference frame, or "earth frame") as necessary to ensure that any visual information projected onto the display unit 110 does not include hazardously misleading information (HMI), or any visual information inconsistent with what the user 120 should be seeing at a particular moment.

In embodiments, the image rendering processors 114 may receive each frame of image data from one or more image sources 122 along with its associated head pose data as determined by the head tracker 104. For example, frames of video data may be sent to the image rendering platform 112, and between the HWD unit 102 and image rendering platform, via HDMI video bus 118.

Further, the image rendering processors 114 may receive symbology for display in combination with received frames of image data from the GGP 116 (e.g., symbology generator). For example, symbology received from the GGP 116 corresponding to a given inertial reference frame may include earth-frame and head-frame symbology, both of which must be presented to the user 120 with their associated image data in an accurate, timely (e.g., without undue latency), and non-hazardous fashion.

In embodiments, the image rendering processors 114 may distinguish head-frame symbology from earth-frame symbology via color-based encoding. For example, the image rendering processors 114 may encode all head-frame symbology according to a first color and all earth-frame symbology according to a second color. In embodiments, the image rendering processors 114 may produce an enhanced image based on each received frame of input data by embedding the color-encoded head-frame and earth-frame symbology, as well as the head pose associated with the input image, in the enhanced image.

By way of a non-limiting example, the GGP 116 may generate symbols displayable according to RGB (red, green, blue) color mode. For example, any pixel may be encoded for display in one of $256^3$ possible colors (~16.8 million) according to red, green, and blue values; each pixel may have an RGB value [R, G, B] wherein each color is assigned one of 256 possible color values (e.g., ascending color intensities), 0 through 255. Similarly, as $256=16^2$, each individual color value may be expressed as a hexadecimal between 0x00 and 0xFF and the full color encoding expressible as a hexadecimal between 000000 (black) and FFFFFF (white). Accordingly, the image rendering processors 116 may encode all pixels and pixel sets corresponding to head-frame symbology with a blue color value [0, 0, B] in the blue color channel, wherein B is an integer between 0 and 255, and all pixels and pixel sets corresponding to earth-frame symbology with a green color value [0, G, 0] in the green color channel, wherein G is likewise an integer between 0 and 255. As discussed below, as a result enhanced images may include embedded symbology in blue and green hues of varying intensity (e.g., 001000 and 000010 may be respectively a very dark low-intensity green and blue not easily distinguishable from black, while 00FF00 and 0000FF are respectively associated with vivid green and blue).

In some embodiments, the image rendering processors 114 may color-encode information within a common color channel. For example, the image rendering processors 114 may encode head-frame symbology within a predetermined color range of the blue color channel, e.g., [0, 0, B] wherein B is between 129 and 255 (000081-0000FF, corresponding to a higher-intensity blue) and earth-frame symbology within a different color range of the blue color channel, e.g., [0, 0, B] wherein B is between 0 and 128 (000000-000080, corresponding to a lower intensity blue).

The input images received by the image rendering processors 114 may include embedded head pose data as well as encoded symbology. For example, embedded head pose data may include a pixel set indicative of a particular frame of image data and including the head pose data associated with the frame as determined by the head tracker 104. In embodiments, the image rendering processors 114 may encode embedded head pose data according to a third color value, color range, or color channel. For example, color-encoded embedded head pose data may be retained in the enhanced image received by the tracker processor 106 and provided to the pose augmentation processor 108, wherein pixels and pixel sets of the enhanced image corresponding to earth-frame symbology (and color-encoded accordingly by the image rendering processors 114) may be adjusted according to the embedded head pose data. The tracker processors 106 may remove embedded head pose information from the output image provided to the display unit 110 for presentation to the user 120.

In embodiments, enhanced images may be sent back to the HWD proper for display and received by the tracker processor 106. For example, as each enhanced image is received by the tracker processor 106, any pixels or pixel sets color-encoded as head-frame symbology may be buffered or retained while any pixels or pixel sets color-encoded as earth-frame symbology may be forwarded to the pose augmentation processor 108. In embodiments, the pose augmentation processor 108 may be implemented as a field programmable gated array (FPGA), application specific integrated circuit (ASIC), or any other appropriate programmable logic device. For example, the pose augmentation processor 108 may adjust any received earth-frame symbology pixel sets (e.g., via rotation, translation, transformation, or any combination thereof) according to the head pose of the associated enhanced image.

In some embodiments, one or more frames of image data may be associated with head pose data corresponding to an earth-centered inertial reference frame (e.g., "earth-frame") rather than a head frame. For example, the tracker processor 106 may instead buffer or retain pixels and pixel sets encoded as earth-frame symbology and forward to the pose augmentation processor 108 head-frame symbology for adjustment according to the earth-frame head pose data. Accordingly, any subsequent references to head-frame symbology and adjusted earth-frame symbology may be interchanged to refer to earth-frame and adjusted head-frame symbology.

In embodiments, the tracker processor 106 may assemble output images based on the image data and the associated head-frame symbology and adjusted earth-frame symbology (e.g., or, as noted above, the associated earth-frame and adjusted head-frame symbology). For example, the tracker processor 106 may render the still color-encoded head-frame and adjusted earth-frame symbology over the enhanced image and remove any color encoding from the symbology, resulting in a monochrome-symbol output image (e.g., wherein all symbology is rendered in a uniform color, e.g., green). In embodiments, the tracker processor 106 may forward the monochrome-symbol output image to the display unit 110 for presentation to the user 120. Further, the tracker processor 106 may identify and remove any color-encoded (e.g., via third-color encoding as described above) embedded pose data from the output image.

In embodiments, the rendering of output images by the tracker processor 106, wherein head-frame and adjusted earth-frame symbology are overlaid on the output image in a uniform color, may result in symbol collisions. For example, the tracker processor 106 may render the output image by first drawing adjusted earth-frame symbology over the image data and then drawing head-frame symbology over the adjusted earth-frame symbology. This may result in two or more symbols drawn over the same image space, which may render one or more of the drawn symbols unreadable. In embodiments, the HWD system 100 may alleviate symbol collision challenges via color encoding as described below.

Figure 2:
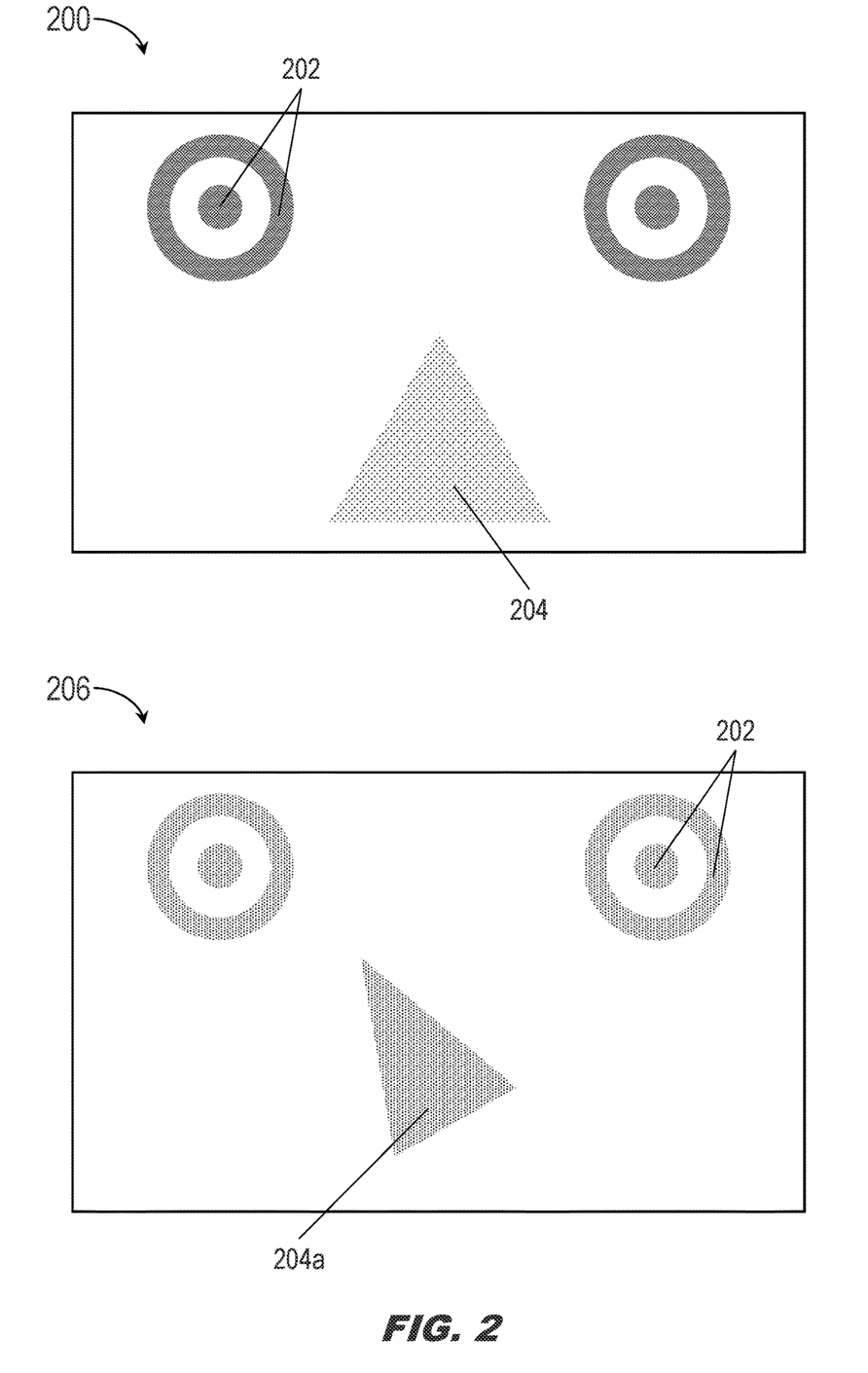
FIG. 2 illustrates input and output images of the HWD system of FIG. 1.

FIG. 2—Input and Output Images

Referring now to FIG. 2, an enhanced image 200 produced by the image rendering processors 114 is shown.

In embodiments, the enhanced image 200 may include (e.g., in addition to video or image data) head-frame symbology 202 encoded according to a first color value, color range, or color channel (e.g., within the blue color channel) and earth-frame symbology 204 encoded according to a second color value, range, or channel (e.g., within the green color channel).

In embodiments, the output image 206 may be produced by the tracker processor (106, FIG. 1) based on the enhanced image 200 (and associated head pose) received by the tracker processor from the image rendering processors 114. For example, the green-encoded pixel set corresponding to the earth-frame symbology (204, FIG. 2A) may be forwarded by the tracker processor 106 to the pose augmentation processor (108, FIG. 1) for adjustment according to the embedded head pose, resulting in the adjusted (e.g., rotated, translated) pixel set 204a corresponding to the adjusted earth-frame symbology.

In embodiments, the tracker processor 106 may remove all color encoding from the head-frame and adjusted earth-frame symbology 202, 204a of the output image 206. For example, the tracker processor may first draw the adjusted earth-frame symbology 204a in its adjusted location within the output image, and then overlay the head-frame symbology 202, in a uniform color (e.g., a brighter green than the green value with which the earth-frame symbology 204 was encoded).

Figure 3A:
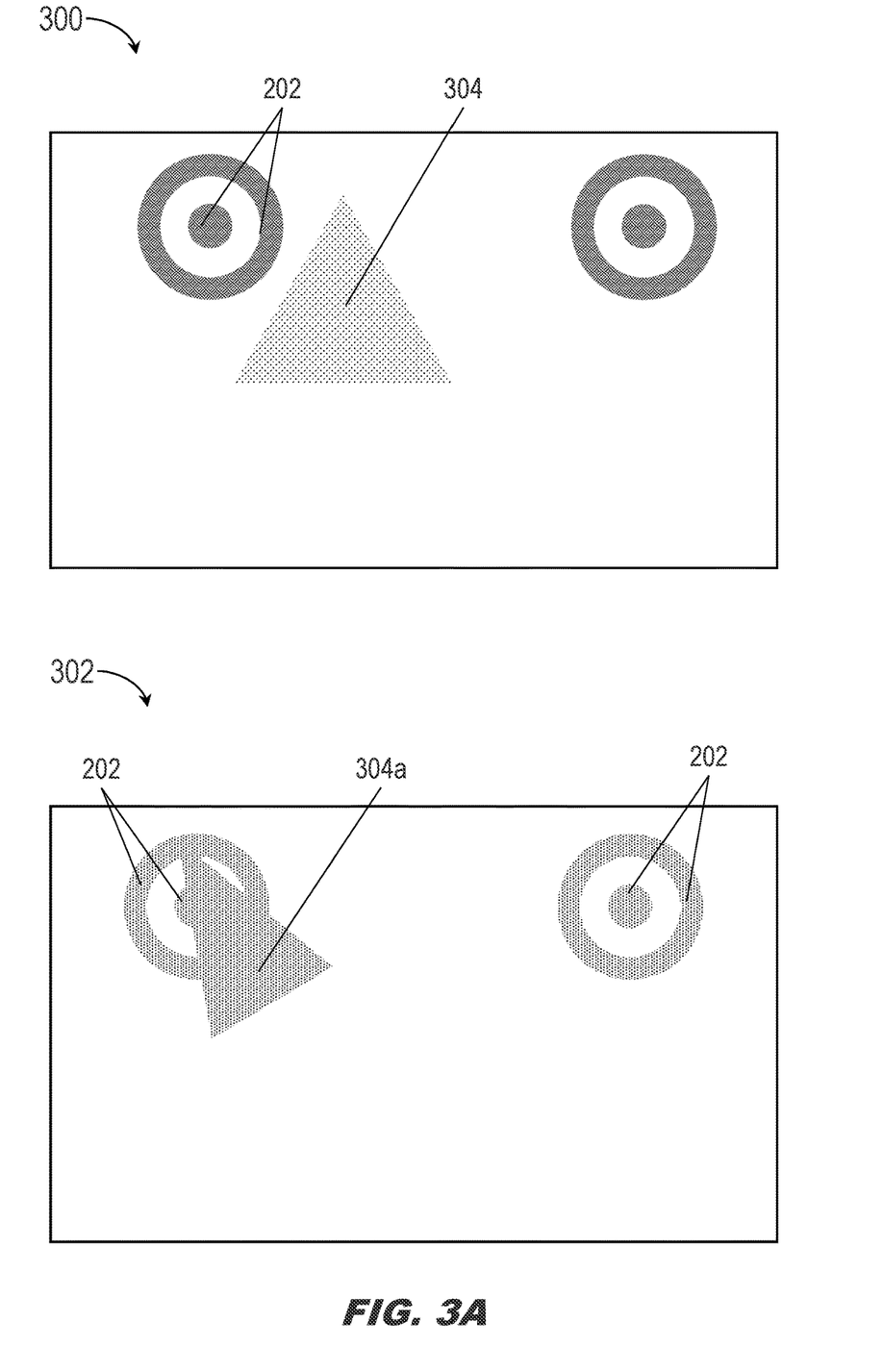
FIGS. 3A and 3B illustrate symbol collision management operations of the HWD system of FIG. 1.
Figure 3B:
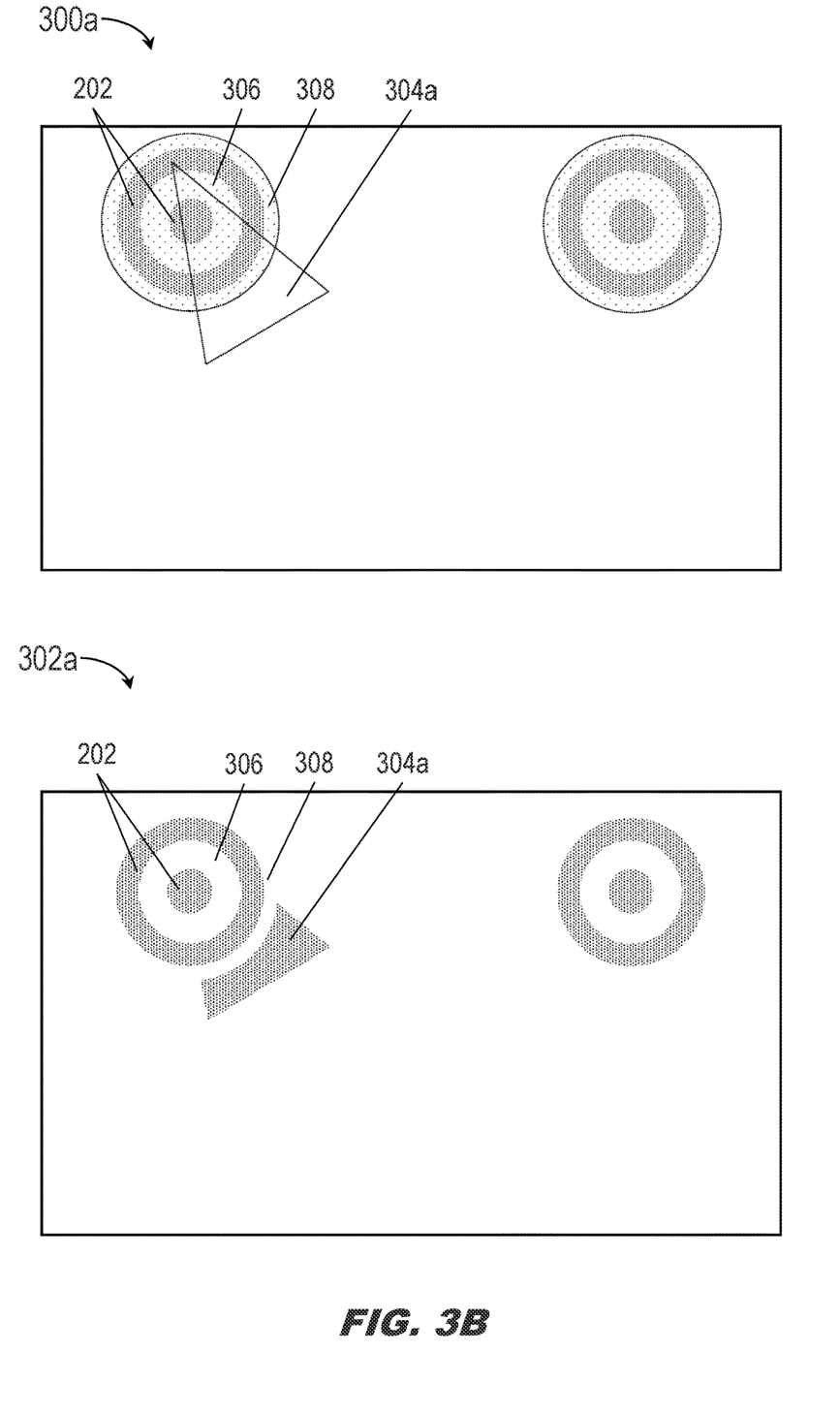

FIGS. 3A and 3B—Symbol Collision

Referring now to FIG. 3A, the enhanced image 300 and output image 302 may be implemented similarly to the enhanced image 200 and output image 206 of FIGS. 2A and 2B, except that the adjustment of the earth-frame symbology 304 by the pose augmentation processors 108 may result, with respect to the output image 302, in a symbol collision wherein the head-frame symbology 202 is drawn over the adjusted earth-frame symbology 304a, at least partially obscuring one or both symbols and potentially rendering one or both symbols undesirably unreadable.

Referring also to FIG. 3B, the enhanced image 300a and the output image 302a may be implemented similarly to the enhanced image 300 and output image 302 of FIG. 3A except that in some embodiments, the image rendering processors 114 may additionally encode portions of the head-frame symbology 202 to indicate masks 306 and/or haloes 308. For example, the image rendering processors 114 may encode the head-frame symbology 202 according to the blue color range 000081-0000FF, corresponding to a higher-intensity blue. In embodiments, the image rendering processors 114 may additionally encode masks 306 and haloes 308 according to the blue color range 000001-000081, corresponding to a lower-intensity (but not zero-intensity) blue that may be nearly indistinguishable from black. For example, the output image 302a may present head-frame symbology 202 drawn over adjusted earth-frame symbology 304a, wherein masks 306 and haloes 308 encoded into the head-frame symbology 202 alleviate potential symbol collision with the adjusted earth-frame symbology 304a.

In some embodiments, head-frame and earth-frame symbology generated by the GGP (116, FIG. 1) may reflect a symbol hierarchy wherein, for example, higher-priority head-frame symbology 202 is drawn by the tracker processor 106 over lower-priority head-frame symbology, which in turn is drawn over adjusted earth-frame symbology 304a. Similarly, head-frame symbology 202 and earth-frame symbology 304, 304a may collectively incorporate a joint hierarchy where symbology is prioritized regardless of its associated inertial reference frame. For example, head-frame symbology 202 may include airspeed, altitude, and approach-mode symbology while adjusted earth-frame symbology 304a may include flight path vector symbology and earth-frame horizon line. In embodiments, adjustment of the horizon line by the pose augmentation processor 108 may cause the adjusted horizon line to collide with other head-frame symbology. For example, the earth-frame horizon line may have a higher priority than the head-frame approach-mode symbology but a lower priority than the head-frame altitude symbology. Accordingly, the output image 302a may mask and/or halo (306, 308) the adjusted earth-frame horizon line so the head-frame airspeed symbology may be displayed over the horizon line. Similarly, the output image 302a may mask and/or halo (306, 308) the head-frame approach-mode symbology relative to the adjusted earth-frame horizon line, such that the horizon line may be displayed over the approach-mode symbology. In embodiments, the image rendering processors 114 may further encode symbol hierarchy into the enhanced image by encoding higher-priority head-frame symbology 202 according to a higher-intensity color range or value and lower-priority head-frame symbology according to a lower-intensity color range or value (e.g., but within the same color channel as was used for the higher-priority head-frame symbology) to indicate symbol hierarchy and drawing order to the tracker processors 106. For example, the above-cited embodiments may encode the high-priority head-frame airspeed symbology in a relatively intense or bright blue, the moderate-priority earth-frame horizon line in a moderately intense green, and the low-priority approach-mode symbology in a relatively low-intensity blue.

In some embodiments, the image rendering processors 114 may otherwise indicate head-frame symbology 202 or other high-priority symbology to be haloed by encoding high-priority symbology according to an otherwise unused color channel or color range. For example, encoding the head-frame symbology as [1, 0, B], where B is an integer, such that the encoded red color value indicates to the tracker processor 106 that a halo 308 should be included around the head-frame symbology in the output image.

Figure 4:
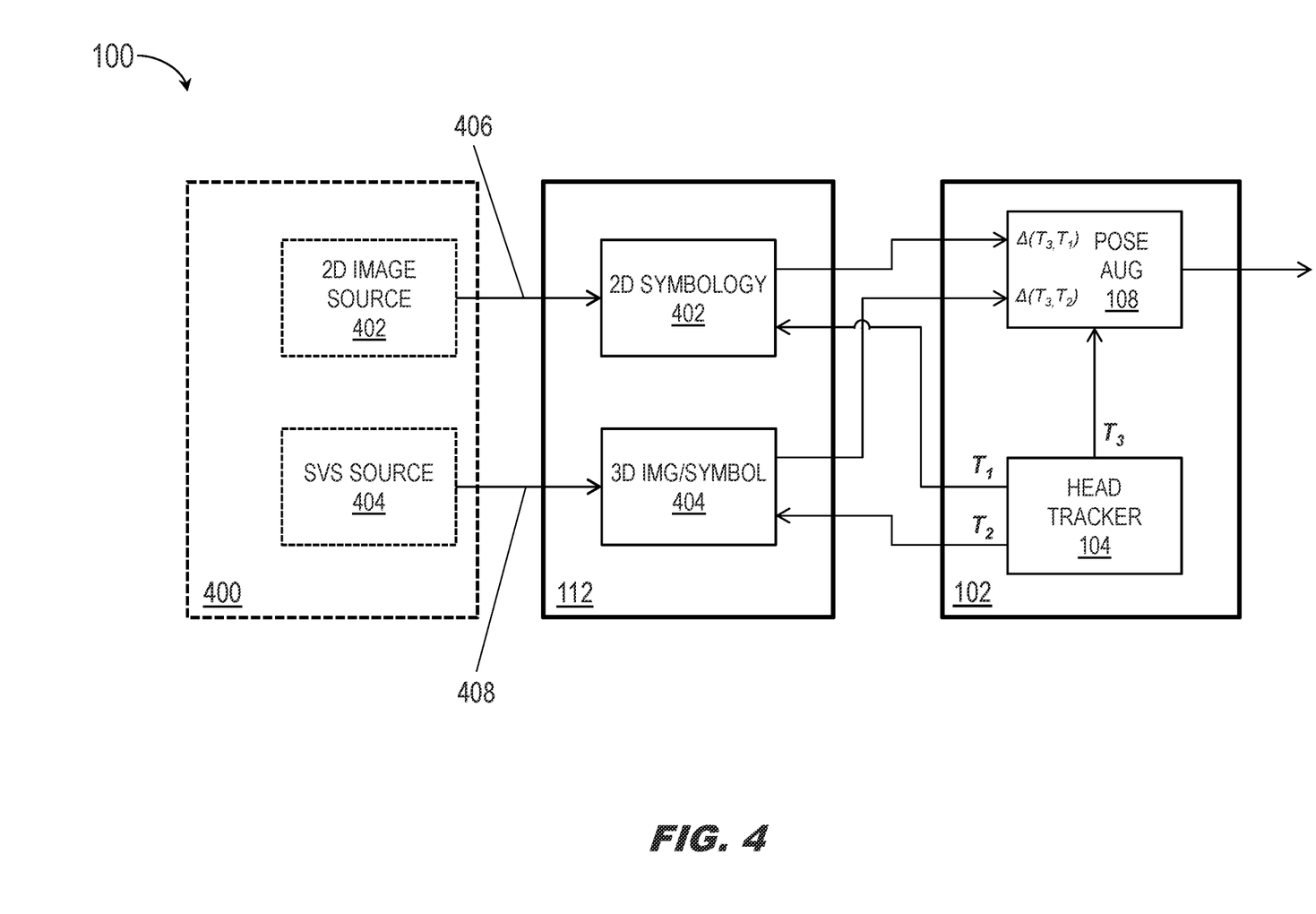
FIG. 4 is a block diagram illustrating multi-source channeled processing operations of the HWD system of FIG. 1.

FIG. 4—Combined Image Processing

Referring now to FIG. 4, the HWD system 100 is shown.

In embodiments, the HWD system 100 may be in communication with a combined vision system 400 (CVS) incorporating a two-dimensional (2D) image source 402, e.g., an image source incorporating 2D symbology, and a three-dimensional (3D) synthetic vision (SVS) source 404, e.g., an image source incorporating 3D/SVS symbology. For example, 2D image data 406 received by the image rendering platform 112 from the 2D image source 402 may incorporate 2D head-frame and earth-frame symbology and embedded head pose data determined by the head tracker 104 of the HWD 102 at a first time $T_1$. Similarly, 3D image data 408 received by the image rendering platform 112 from the SVS source 404 may incorporate 3D head-frame and earth-frame symbology and embedded head pose data determined by the head tracker 104 at a second time $T_2$ subsequent to the first time.

In embodiments, a combined image may be displayed by the HWD 102 (e.g., via the display unit (110, FIG. 1)) at a display time $T_3$ subsequent to the second time. Accordingly, the pose augmentation processors 108 may update encoded earth-frame symbology (e.g., or head-frame symbology, as desired) to align with the current head pose corresponding to the display time $T_3$. In embodiments, the pose augmentation processors 108 may adjust (e.g., rotate, translate, transform) the encoded 2D head-frame or earth-frame symbology based on the current head pose (e.g., corresponding to the display time $T_3$) and a time difference between $T_3$ and $T_1$. Similarly, the pose augmentation processors 108 may adjust (e.g., rotate, translate, transform) the encoded 3D head-frame or earth-frame symbology based on the current head pose and a time difference between $T_3$ and $T_2$.

Figure 5A:
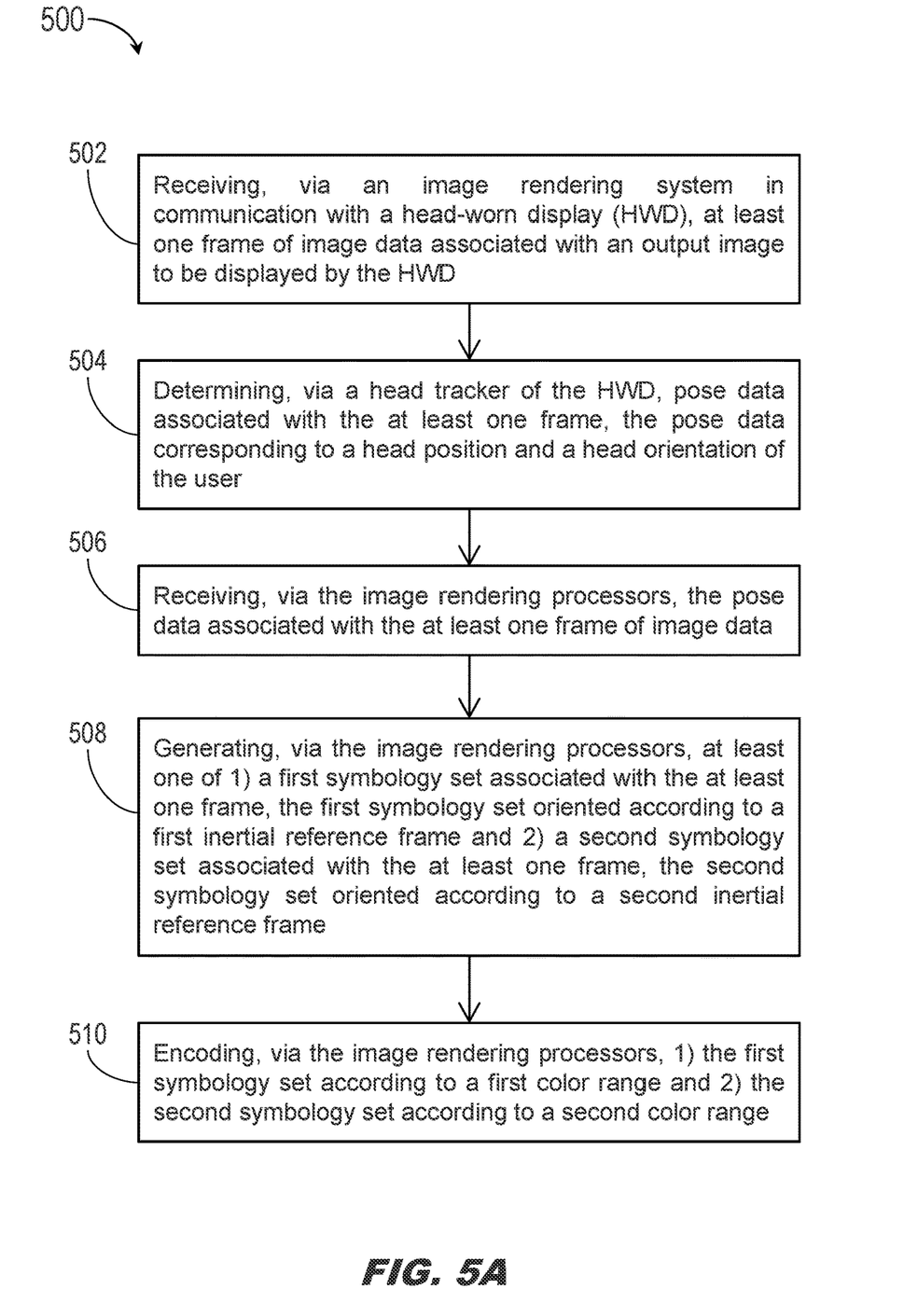
FIGS. 5A and 5B are flow diagrams illustrating a method for head-frame symbology processing according to with example embodiments of this disclosure.
Figure 5B:
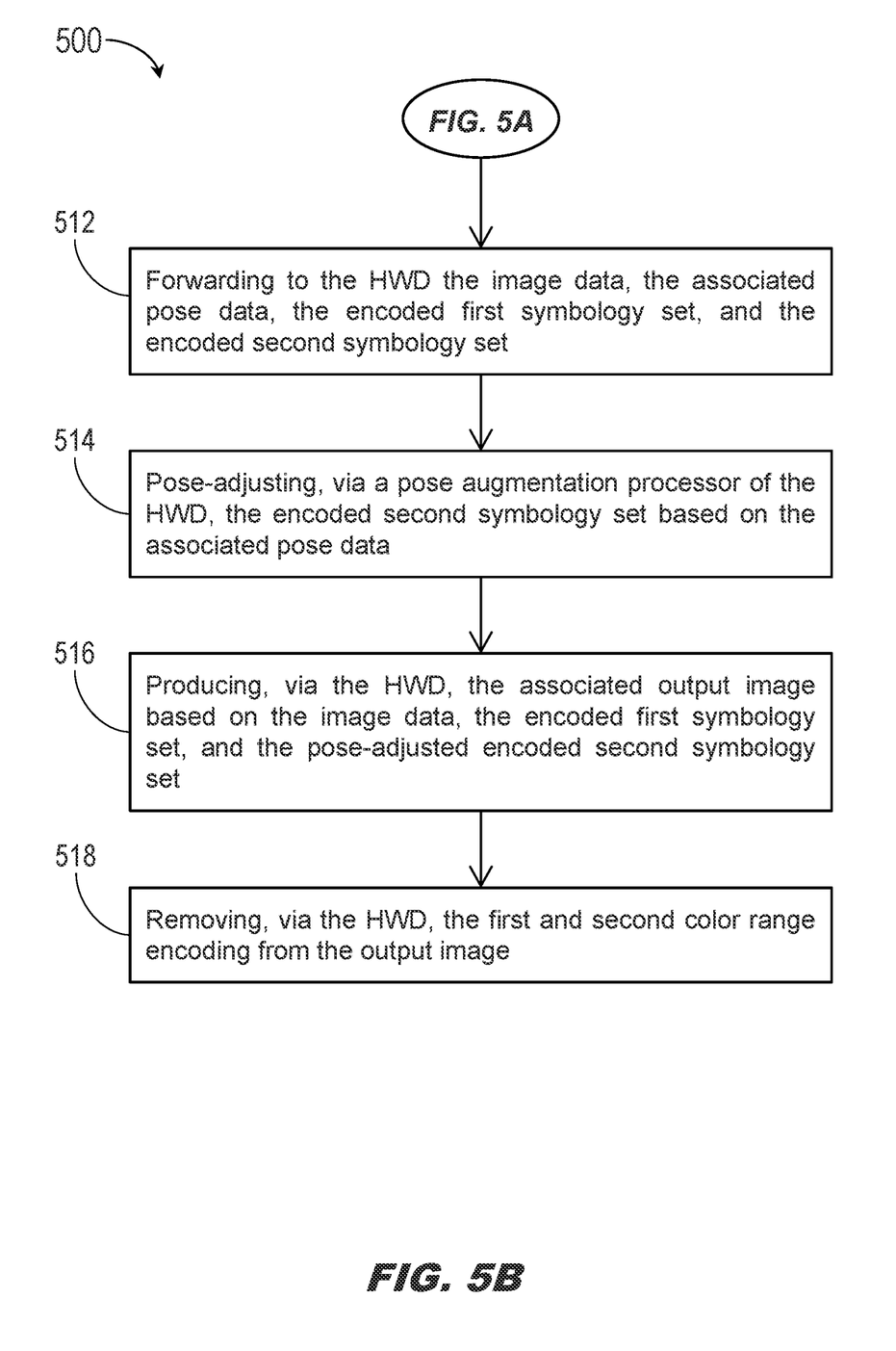

FIGS. 5A and 5B—Method

Referring to FIG. 5A, the method 500 may be implemented by the HWD system 100 and may include the following steps.

At a step 502, the image rendering platform of the HWD system receives image data (e.g., video data) for display to the HWD user.

At a step 504, the HWD head tracker determines a current head pose of the user corresponding to the received frame of image data. For example, the current head pose may be in a head-centered inertial reference frame ("head-frame") or an earth-centered inertial reference frame ("earth-frame").

At a step 506, the image rendering platform receives from the head tracker the head pose data corresponding to the current received frame of image data. In some embodiments, the image rendering platform receives image data from multiple sources, e.g., 2D image data and/or symbology corresponding to first head pose data associated with a first time (e.g., a first time of generation), and 3D image data and/or symbology corresponding to second head pose data associated with a second time.

At a step 508, the symbology generator (e.g., graphics generation processors) provides sets of head-frame symbology and earth-frame symbology corresponding to the current frame of image data, each symbology set according to the head frame or the earth frame.

At a step 510, the image rendering processors color-encode the head-frame and earth-frame symbology sets. For example, any pixels or pixel sets corresponding to head-frame symbology may be encoded according to a particular color channel, color range, or color value (e.g., blue, highintensity blue, specific shade of blue). Similarly, any pixels or pixel sets corresponding to earth-frame symbology may be encoded according to a color channel, range, or value distinguishable by the tracker processors of the HWD from the head-frame symbology, e.g., green, lower-intensity blue, different shade of blue). In some embodiments, the image rendering processors may embed the associated head pose in the image data, encoding the embedded head pose data in a third color channel, range, or value distinguishable from the encoded head-frame and earth-frame symbology sets (e.g., white).

Referring also to FIG. 5B, at a step 512, the image rendering platform forwards an enhanced image (e.g., comprising the image data, the embedded head pose, and the encoded head-frame and earth-frame symbology sets) to the tracker processors of the HWD.

At a step 514, pose augmentation processors of the HWD receive (e.g., from the tracker processors) the color-encoded pixels and pixel sets corresponding to the earth-frame symbology within the enhanced image and pose-adjusts (e.g., rotates, translates, transforms) the encoded pixels and pixel sets corresponding to the earth-frame symbology set to conform with the associated head-frame head pose of the image data. In some embodiments, the associated head pose is in the earth-frame, and accordingly the pose augmentation processors receive and pose-adjust the pixels and pixel sets corresponding to the head-frame symbology set to conform with the earth-frame head pose data. In some embodiments, the output image is based on earth-frame symbology drawn over pose-adjusted head-frame symbology. In some embodiments, when the image rendering platform receives multiple frames of image data from multiple sources, each frame of image data associated with a different head pose corresponding to a different time, the pose augmentation processors pose-adjust the appropriate symbology for each frame of image data by time-differencing a display time determined by the head tracker and the original time of the associated head pose.

At a step 516, the tracker processors produce an output image based on the enhanced image data, the head-frame symbology, and the adjusted earth-frame symbology. For example, the tracker processor may remove any color encoding and embedded head pose data from the output image, resulting in an output image with a monochrome symbology overlay. In some embodiments, head-frame symbology may be drawn over pose-adjusted earth-frame symbology, and higher-priority symbology drawn over lower-priority symbology. For example, color encoding of higher-priority symbology may account for masks and/or halos incorporated into the output image by the tracker processor to alleviate or prevent collision of symbols drawn over the same pixel space.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system, comprising:
   a head-worn display (HWD) wearable by a user, the HWD comprising:
   at least one display unit for presenting output images to the user; and
   at least one head tracker configured to determine pose data associated with a head position and a head orientation of the user; and
   an image processing module in communication with the HWD, the image processing module comprising:
   one or more graphics generation processors configured to:
   receive at least one frame of image data corresponding to an output image;
   receive from the at least one head tracker the pose data corresponding to the image data;
   generate, at least one of 1) a first symbology set associated with the at least one frame, the first symbology set oriented according to a first inertial reference frame and 2) a second symbology set associated with the at least one frame, the second symbology set oriented according to a second inertial reference frame;
   determine and assign a hierarchy to the first symbology set and the second symbology set; and
   one or more image rendering processors in communication with the graphics generation processors, the image rendering processors configured to:
   encode the first symbology set according to a first color range;
   encode the second symbology set according to a second color range;
   embed the associated pose data in the image data; and
   forward to the HWD the image data, the encoded first symbology set, the encoded second symbology set, and embedded pose data;
   wherein the HWD further comprises a pose augmentation processor and a tracker processor, the tracker processor configured to:
   forward the encoded second symbology set and the embedded pose data to the pose augmentation processor;
   produce the output image based on the image data, the encoded first symbology set, a pose-adjusted encoded second symbology set, and the hierarchy previously determined, wherein higher-priority symbology is drawn over lower-priority symbology in the output image;
   remove the first and second color range encoding from the output image; and
   forward the output image to the display unit; and
   the pose augmentation processor configured to produce the pose-adjusted encoded second symbology set by adjusting the encoded second symbology set based on the associated pose data.

2. The system of claim 1, wherein:
the pose data is head pose data associated with a head-centered inertial reference frame;
the encoded second symbology set is associated with an earth-centered inertial reference frame; and
the pose augmentation processor is configured to adjust the encoded second symbology set according to the head-centered inertial reference frame.

3. The system of claim 1, wherein:
the pose data is associated with an earth-centered inertial reference frame;
the encoded second symbology set is associated with a head-centered inertial reference frame; and
the pose augmentation processor is configured to adjust the encoded second symbology set according to the earth-centered inertial reference frame.

4. The system of claim 1, wherein the tracker processor is configured to produce each output image by drawing the encoded first symbology set over the adjusted encoded second symbology set.

5. The system of claim 1, wherein at least one of the encoded first symbology set or the encoded second symbology set comprises:
at least one first encoded pixel set encoded according to a first color value within the first color range or the second color range; and
at least one second encoded pixel set encoded according to a second color value lower than the first color value.

6. The system of claim 5, wherein:
the at least one first encoded pixel set corresponds to one or more symbols having a first priority; and
the at least one second encoded pixel set corresponds to one or more symbols having a second priority lower than the first priority.

7. The system of claim 5, wherein:
the at least one first encoded pixel set corresponds to one or more symbols; and
the at least one second encoded pixel set corresponds to one or more of a mask or a halo associated with the one or more symbols.

8. The system of claim 1, wherein:
the image rendering processors are configured to encode the embedded pose data according to a third color range; and
the tracker processor is configured to remove the third color range encoding and the embedded pose data from the output image.

9. The system of claim 1, wherein:
the first color range corresponds to a first color channel; and
the second color range corresponds to a second color channel.

10. The system of claim 1, wherein:
the first color range corresponds to a first subset of an RGB color channel; and
the second color range corresponds to a second subset of the RGB color channel.

11. The system of claim 1, wherein:
the head tracker is configured to determine display pose data corresponding to a display time of the output image;
wherein the image processing module is configured to:
receive first image data corresponding to first pose data and to a first time; and
receive second image data corresponding to second pose data and to a second time;

wherein the pose augmentation processor is configured to:
adjust the at least one encoded second symbology set associated with the first image data based on the display pose data and a time difference between the display time and the first time; and
adjust the at least one encoded second symbology set associated with the second image data based on the display pose data and a time difference between the display time and the second time and
wherein the tracker processor is configured to produce a combined output image based on the first image data and the second image data.

12. A method, comprising:
receiving, via an image rendering system in communication with a head-worn display (HWD), at least one frame of image data associated with an output image to be displayed by the HWD;
determining, via a head tracker of the HWD, pose data associated with the at least one frame of image data, the pose data corresponding to a head position and a head orientation of a user;
receiving, via image rendering processors, the pose data associated with the at least one frame of image data;
generating, via the image rendering processors, at least one of 1) a first symbology set associated with the at least one frame, the first symbology set oriented according to a first inertial reference frame and 2) a second symbology set associated with the at least one frame, the second symbology set oriented according to a second inertial reference frame;
encoding, via the image rendering processors, 1) the first symbology set according to a first color range and 2) the second symbology set according to a second color range;
determining and assigning a hierarchy to the first symbology set and the second symbology set;
forwarding to the HWD the image data, the associated pose data, the encoded first symbology set, and the encoded second symbology set;
pose-adjusting, via a pose augmentation processor of the HWD, the encoded second symbology set based on the associated pose data;
producing, via the HWD, the associated output image based on the image data, the encoded first symbology set, the pose-adjusted encoded second symbology set, and the hierarchy previously determined, wherein higher-priority symbology is drawn over lower-priority symbology in the output image; and
removing, via the HWD, the first and second color range encoding from the output image.

13. The method of claim 12, wherein:
the pose data is head pose data associated with a head-centered inertial reference frame;
the encoded second symbology set is associated with an earth-centered inertial reference frame; and
pose-adjusting, via a pose augmentation processor of the HWD, the encoded second symbology set based on the associated pose data includes pose-adjusting the encoded second symbology set based on the head-centered inertial reference frame.

14. The method of claim 12, wherein:
the pose data is associated with an earth-centered inertial reference frame;
the encoded second symbology set is associated with a head-centered inertial reference frame; and
pose-adjusting, via a pose augmentation processor of the HWD, the encoded second symbology set based on the associated pose data includes pose-adjusting the encoded second symbology set based on the earth-centered inertial reference frame.

15. The method of claim 12, wherein producing, via the HWD, the associated output image based on the image data, the encoded first symbology set, and the pose-adjusted encoded second symbology set includes:
  drawing the pose-adjusted encoded second symbology set over the image data; and
  drawing the encoded first symbology set over the pose-adjusted encoded second symbology set.

16. The method of claim 15, wherein encoding, via the image rendering processors, 1) the first symbology set according to a first color range and 2) the second symbology set according to a second color range includes:
  encoding at least one first pixel subset of the first symbology set according to a first color value within the first color range; and
  encoding at least one second pixel subset of the first symbology set according to a second color value lower than the first color value.

17. The method of claim 16, wherein:
  the at least one first pixel subset corresponds to one or more symbols having a first priority; and
  the at least one second pixel subset corresponds to one or more symbols having a second priority lower than the first priority.

18. The method of claim 16, wherein:
  the at least one first pixel subset corresponds to one or more symbols; and
  the at least one second pixel subset corresponds to one or more of a mask or a halo associated with the one or more symbols.

19. The method of claim 12, wherein:
  encoding, via the image rendering processors, 1) the first symbology set according to a first color range and 2) the second symbology set according to a second color range includes:
    embedding the associated pose data in the image data; and
    encoding the embedded pose data according to a third color range; and
  wherein producing, via the HWD, the associated output image based on the image data, the encoded first symbology set, and the pose-adjusted encoded second symbology set includes removing the third color range encoding and the embedded pose data from the output image.

20. The method of claim 12, wherein:
receiving, via an image rendering system in communication with a head-worn display (HWD), at least one frame of image data associated with an output image to be displayed by the HWD includes receiving 1) first image data corresponding to first pose data and to a first time and 2) second image data corresponding to second pose data and to a second time;
wherein determining, via a head tracker of the HWD, pose data associated with the at least one frame includes determining display pose data corresponding to a display time of the output image; and
wherein pose-adjusting, via a pose augmentation processor of the HWD, the encoded second symbology set based on the associated pose data includes:
  adjusting the at least one encoded second symbology set associated with the first image data based on the display pose data and a time difference between the display time and the first time; and
  adjusting the at least one encoded second symbology set associated with the second image data based on the display pose data and a time difference between the display time and the second time.

* * * * *